(12) United States Patent
Khillan et al.

(10) Patent No.: US 11,749,006 B2
(45) Date of Patent: Sep. 5, 2023

(54) OPTICAL CHARACTER RECOGNITION QUALITY EVALUATION AND OPTIMIZATION

(71) Applicant: INTUIT INC., Mountain View, CA (US)

(72) Inventors: Sameeksha Khillan, Mountain View, CA (US); Prajwal Prakash Vasisht, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/551,236

(22) Filed: Dec. 15, 2021

(65) Prior Publication Data
US 2023/0186661 A1    Jun. 15, 2023

(51) Int. Cl.
*G06V 30/19* (2022.01)
*G06V 30/162* (2022.01)
*G06V 30/26* (2022.01)
*G06V 30/12* (2022.01)

(52) U.S. Cl.
CPC .......... *G06V 30/133* (2022.01); *G06V 30/162* (2022.01); *G06V 30/19113* (2022.01); *G06V 30/26* (2022.01)

(58) Field of Classification Search
CPC .............. G06V 30/133; G06V 30/162; G06V 30/19113; G06V 30/26
See application file for complete search history.

(56) References Cited

U.S. PATENT DOCUMENTS

| 2008/0063279 | A1* | 3/2008 | Vincent | G06F 18/254 |
| | | | | 382/182 |
| 2011/0052062 | A1* | 3/2011 | Chiu | G06V 30/413 |
| | | | | 382/176 |
| 2018/0253620 | A1* | 9/2018 | Sharma | H04N 1/4177 |
| 2022/0156756 | A1* | 5/2022 | Eapen | G06V 10/82 |

\* cited by examiner

*Primary Examiner* — Amandeep Saini
*Assistant Examiner* — Daniella M. DiGuglielmo
(74) *Attorney, Agent, or Firm* — DLA PIPER LLP (US)

(57) ABSTRACT

A processor may receive an image and determine a number of foreground pixels in the image. The processor may obtain a result of optical character recognition (OCR) processing performed on the image. The processor may identify at least one bounding box surrounding at least one portion of text in the result and overlay the at least one bounding box on the image to form a masked image. The processor may determine a number of foreground pixels in the masked image and a decrease in the number of foreground pixels in the masked image relative to the number of foreground pixels in the image. Based on the decrease, the processor may modify an aspect of the OCR processing for subsequent image processing.

20 Claims, 6 Drawing Sheets

OPTICAL CHARACTER RECOGNITION QUALITY EVALUATION AND OPTIMIZATION

BACKGROUND

It is often useful to digitize information found on paper or other physical documents such as receipts and tax forms. The process of recognizing and digitizing the information often leverages sophisticated optical character recognition (OCR) to discern text, numerals, and/or other information-carrying characters from other features of the physical documents. For example, an imaging device or other computing device may obtain an image of a physical document and may apply OCR to the image to identify information. There are a number of OCR systems, algorithms, and/or services available, such as Google OCR and Amazon Textract, with more being developed all the time. Many computerized workflows or processes use off-the-shelf or proprietary OCR technologies as part of a broader effort, such as to digitize information and then use the information as part of an overall computing process. However, not all OCR systems, algorithms, and/or services work well, or are particularly well suited for particular purposes.

In some cases, the product of an OCR operation must meet some quality threshold for continued downstream processing to be possible. OCR products often include their own metrics for accuracy of an output, but these can be biased towards representing an output as more accurate than it really is. The absence of a ground truth, applicable to any OCR methodology interchangeably, prevents an accurate evaluation of OCR quality and, therefore, the suitability of an OCR system or service for a given task.

DETAILED DESCRIPTION OF SEVERAL EMBODIMENTS

Some embodiments described herein can provide unbiased and interpretable evaluations of OCR performance, enabling optimization of OCR use within systems. The disclosed systems and methods yield clear, objective evaluations of OCR performance without bias and without relying on external models. This may be achieved by specific image analysis and processing techniques described in detail below. For example, foreground and/or background pixels can be identified within an image (e.g., where foreground pixels are likely text and background pixels are likely not text). Disclosed embodiments can find bounding boxes from OCR results of processing the image and overlay the bounding boxes on the image to form a masked image. Based on a difference in a number of foreground pixels in the masked image and the original image, OCR performance can be evaluated, and if necessary, remediation actions can be identified and/or applied.

Embodiments disclosed herein can deliver independent and unbiased OCR evaluations which do not rely on external models or possibly biased-metrics from providers. Evaluation results can be interpretable and easy to visualize for all stakeholders, applicable to any text-based modelling tasks including single document tasks, and enabling objective comparisons between OCR systems. Moreover, embodiments disclosed herein provide high speed performance on large data sets (e.g., due to ease of parallel processing), universal applicability, and do not require large seed datasets to obtain robust outputs. Using the results of OCR evaluations, embodiments disclosed herein can improve external computing processes by making changes to OCR settings and/or by changing OCR processing services altogether.

Figure 1:
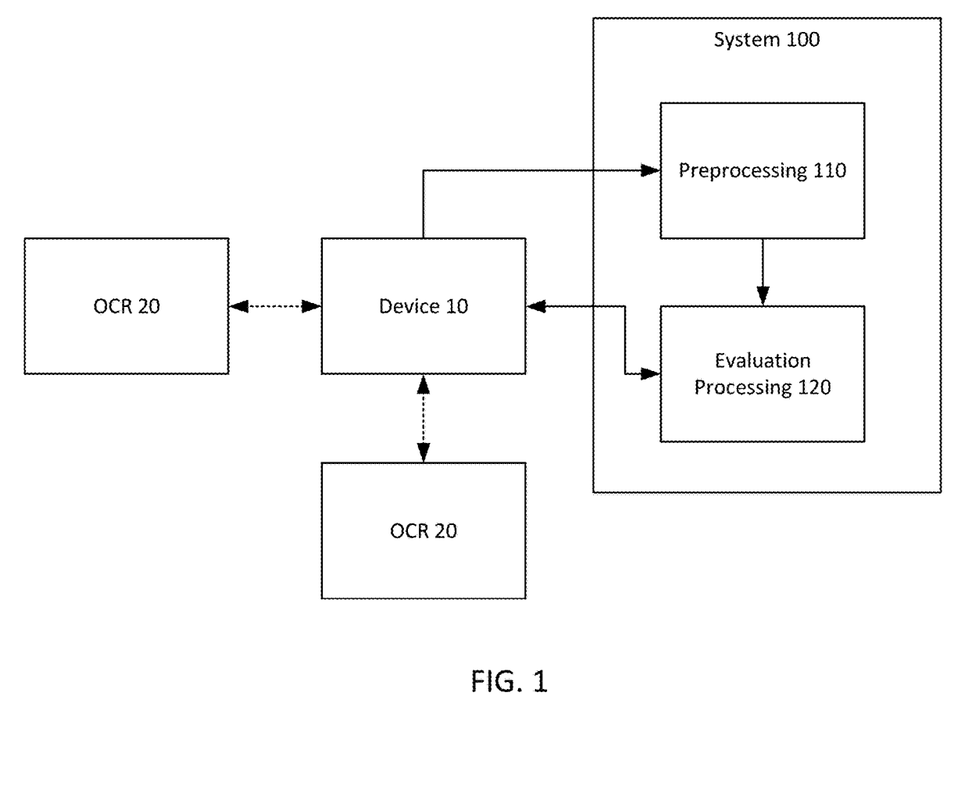
FIG. 1 shows an example OCR evaluation and optimization system according to some embodiments of the disclosure.

FIG. 1 shows an example OCR evaluation and optimization system 100 according to some embodiments of the disclosure. System 100 may include a variety of hardware, firmware, and/or software components that interact with one another and with device 10 and/or OCR system(s) 20. For example, system 100 can include preprocessing 110 and/or evaluation processing 120, each of which may be implemented by one or more computers (e.g., as described below with respect to FIG. 6). As described in detail below, device 10 can supply an image to system 100 and to one or more OCR system(s) 20 (note that while OCR system(s) 20 are shown externally to device 10 in the style of a third-party OCR service, some embodiments of device 10 may include their own onboard OCR system 20). Preprocessing 110 of system 100 can prepare the image from device 10 for use in OCR evaluation. Device 10 can also provide results of processing by OCR system 20 to evaluation processing 120 of system 100 (and/or OCR system 20 can provide the results of processing to evaluation processing 120 in some embodiments). Evaluation processing 120 can use the output of preprocessing 110 to evaluate the OCR results. The results of the evaluation can be used to modify device 10 operation and/or OCR 20 operation as described in detail below. For example, FIGS. 2-5 illustrate the functioning of system 100 in detail.

Device 10, OCR system 20, system 100, and individual elements of system 100 (preprocessing 110 and evaluation processing 120) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while preprocessing 110 and evaluation processing 120 are depicted separately, any combination of these elements may be part of a combined hardware, firmware, and/or software element. Moreover, while one device 10 and two OCR systems 20 are shown, in practice, there may be single instances or multiples of any of these elements and/or these elements may be combined or co-located.

Figure 2:
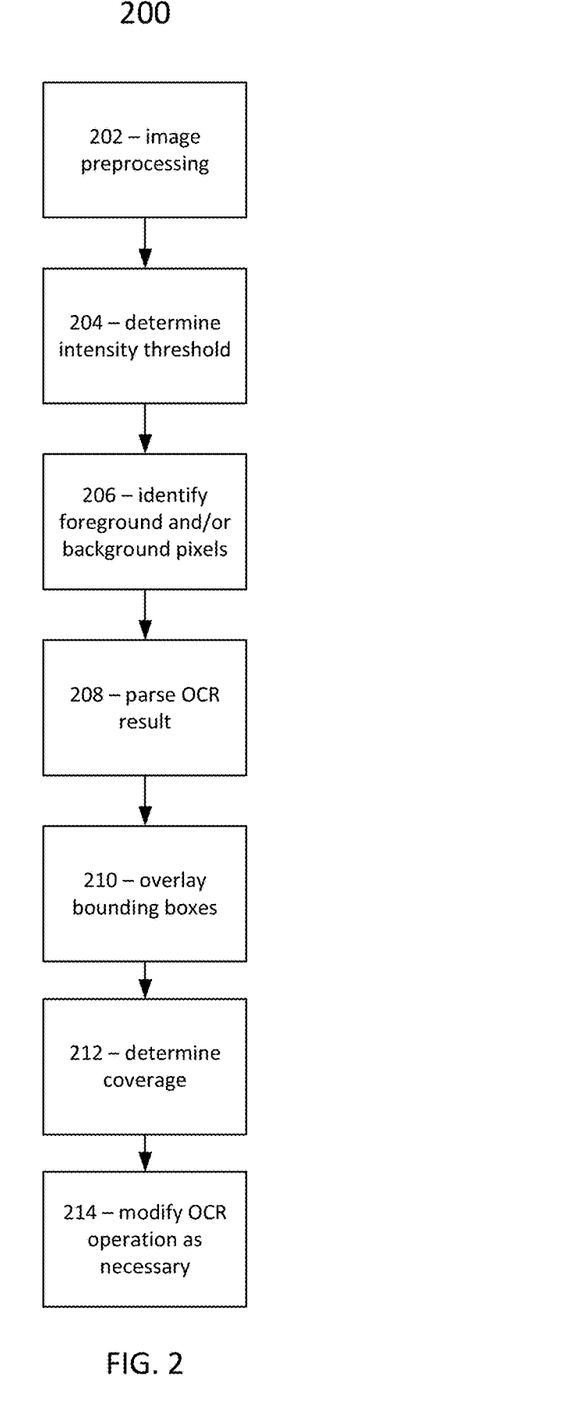
FIG. 2 shows an example OCR evaluation and optimization process according to some embodiments of the disclosure.

FIG. 2 shows an example OCR evaluation and optimization process 200 according to some embodiments of the disclosure. System 100 can perform process 200 to evaluate the output of OCR system(s) 20 and, as necessary, modify OCR operations for device 10, for example altering the OCR techniques utilized by a computerized workflow of device 10. Process 200 can begin upon receipt of an image from device 10. For example, device 10 can provide an image that is slated to be processed using OCR system 20, or that has already been processed using OCR system 20, as part of a workflow being performed by device 10.

At 202, system 100 can perform image preprocessing. Preprocessing can normalize the image to have a standard set of parameters so that the subsequent OCR evaluation is performed consistently across all input images.

Figure 3:
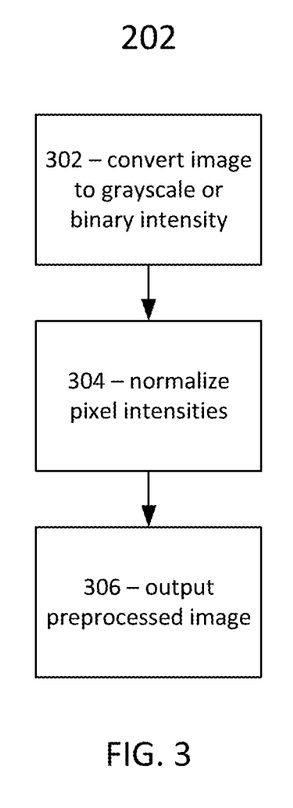
FIG. 3 shows an example preprocessing process according to some embodiments of the disclosure.

FIG. 3 shows an example preprocessing process 202 according to some embodiments of the disclosure. Process 202 can be performed by preprocessing 110 of system 100.

At 302, preprocessing 110 can convert the image to grayscale or to a binary intensity. This conversion can remove any color bias in the image, preventing source images that are in color from being treated differently from source images that are not in color, or preventing source images that have one color palette from being treated differently from source images having another color palette.

Preprocessing 110 can use any available technique to convert the image to grayscale or binary intensity. For example, preprocessing 110 may use one or more inbuilt Python image processing packages like Pillow or matplotlib to alter a data matrix for the image. The image data matrix can contain color or intensity information, depending on the type of image. At 304, preprocessing 110 can standardize data matrices to a common format using these packages, thereby normalizing images to a standardized form for further processing. This conversion can help remove bias due to color or brightness variations.

While not illustrated in FIG. 3, some embodiments may apply other preprocessing to the image. For example, OCR systems 20 are able to crop out the backgrounds when they perform OCR processing. In like fashion, some embodiments may crop backgrounds from the image as a preprocessing action. Many types of preprocessing are compatible with the subsequent processing described in detail below, as long as they are applied uniformly to every image that is processed by every OCR system 20 under evaluation by the disclosed embodiments.

At 306, preprocessing 110 can output the preprocessed image as processed at 302 and 304. For example, the preprocessed image may proceed to further processing by evaluation processing 120 as described in detail below.

Returning to FIG. 2, at 204, system 100 can determine an intensity threshold for the image. The intensity threshold can be used to separate out the background of the image from the foreground, where the foreground may be an area of interest such as an area containing the text that will undergo OCR processing. System 100 can use any technique that can distinguish intensities. For example, some embodiments can calculate an average pixel intensity for the image which can serve as the threshold. Other embodiments may use other techniques, such as calculating a weighted average pixel intensity or calculating another output relying on a combination of image pixel intensities.

Figure 4:
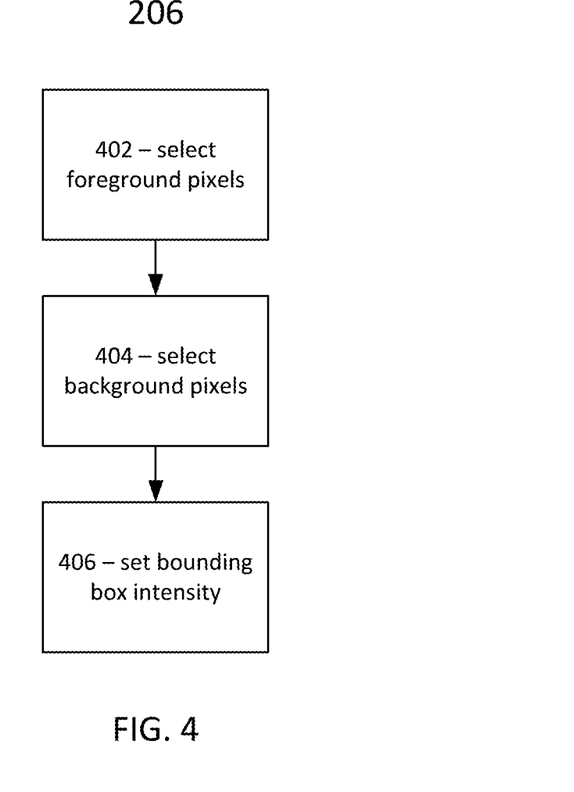
FIG. 4 shows an example pixel identification process according to some embodiments of the disclosure.

At 206, system 100 can identify foreground and/or background pixels in the image. FIG. 4 shows an example pixel identification process 206 according to some embodiments of the disclosure.

At 402, system 100 can select foreground pixels. For example, system 100 can determine that any pixel having an intensity above the intensity of the threshold determined at 204 is a foreground pixel. In this example, foreground pixels are darker than background pixels. System 100 can also determine a count of the total number of foreground pixels.

At 404, system 100 can select background pixels. For example, system 100 can determine that any pixel having an intensity below the intensity of the threshold determined at 204 is a background pixel. System 100 can also determine a count of the total number of background pixels.

At 406, system 100 can set a bounding box intensity. For example, system 100 can determine an average intensity of the background pixels identified at 404. System 100 can set the bounding box intensity to be the same as this average intensity. As explained in detail below, this will allow the bounding box to appear to be part of the background in subsequent processing. In some embodiments, such as a binary intensity embodiment where the foreground is black and the background is white, the processing at 406 would result in a white bounding box and non-white foreground elements, for example. In cases where the average intensity of the background pixels indicates a color other than white, the bounding box will likewise be that color other than white. For brevity, the background/bounding box color is referred to elsewhere herein as "white," and the foreground color is referred to elsewhere herein as "non-white," but it will be understood that some embodiments will use other colors.

While the example of FIG. 4 assumes foreground pixels are darker than background pixels, other embodiments may operate in reverse, where foreground pixels are lighter than background pixels. In these other embodiments, any pixel having an intensity below the intensity of the threshold determined at 204 can be selected as a foreground pixel, and any pixel having an intensity above the intensity of the threshold determined at 204 can be selected as a background pixel. Likewise, the bounding box intensity in these embodiments would be set higher than the threshold intensity.

System 100 can obtain a result of OCR processing performed on the image by OCR system 20. Returning to FIG. 2, at 208, system 100 can parse a result of OCR processing performed on the image. For example, OCR system 20 may return its response in one or more proprietary formats (e.g., json or xml strings with metadata). Each third-party OCR system 20 that could be in communication with device 10, and even proprietary OCR systems 20 integrated with device 10, has its own format. System 100 may use one or more parsers to identify relevant information for further processing and place it into a generic format.

For example, to parse the information into a generic format for OCR result extraction, and referencing API response structures provided by OCR vendors, system 100 may identify Kye-value pairs to be extracted for the subsequent processing. For example, Textract OCR has a JSON type response. System 100 can extract line-level bounding boxes by identifying specific keys related to this. To enable further processing, system 100 can produce python data structures such as pandas data frames and python lists which can be modified, processed, and persisted as desired.

An example of relevant information for further processing is bounding box coordinate information. OCR bounding box information is available at several levels, and embodiments of system 100 can utilize information from different levels including, but not limited to, page, paragraph, line, word, and/or character levels. System 100 can get other information from OCR such as confidence values for extracted OCR words or characters and other information, which may not be useful for some embodiments of this process and, if so, may be disregarded by system 100.

At 210, system 100 can overlay bounding boxes onto the image. Data from the parsing performed at 208 may include information defining the position and size of one or more bounding boxes, such as bounding box coordinates. The bounding boxes each respectively surround a portion of text recognized by the OCR processing and included in the OCR results. The bounding boxes may be line level bounding boxes, word level bounding boxes, or others. As long as the same bounding box level is used consistently for all OCR result evaluation, any bounding box level may be used. System 100 can overlay the one or more bounding boxes on the image at the position(s) indicated by the data from the parsing to create a masked image. The masked image may include foreground pixels that have not been covered by bounding boxes, background pixels, and/or masked pixels covered by bounding boxes. System 100 can set pixel intensity of the one or more bounding boxes to be the intensity determined at 406 of process 400, as described above. Accordingly, the background pixels and masked pixels covered by bounding boxes will have the same intensities.

Figure 5:
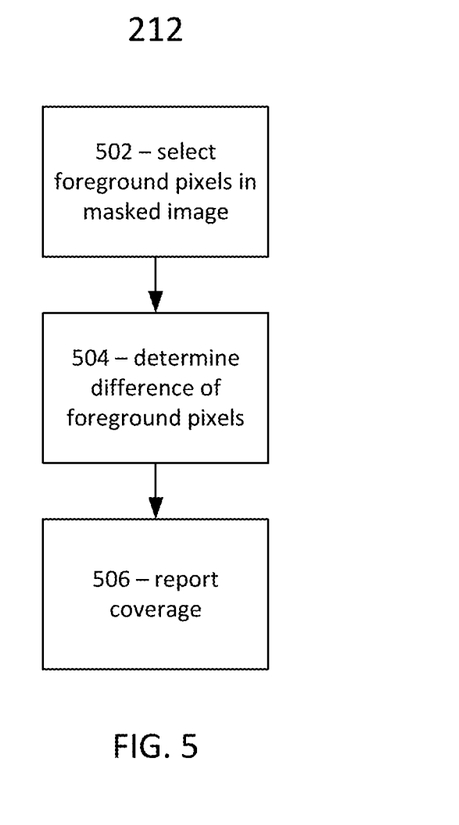
FIG. 5 shows an example coverage determination process according to some embodiments of the disclosure.

At 212, system 100 can determine the coverage of the OCR processing. FIG. 5 shows an example coverage determination process 212 according to some embodiments of the disclosure.

At 502, system 100 can select foreground pixels in the masked image produced at 210. For example, system 100 can determine that any pixel in the masked image having an intensity above the intensity of the threshold determined at 204 is a foreground pixel in the masked image. In this example, foreground pixels are darker than background pixels. System 100 can also determine a count of the total number of foreground pixels in the masked image.

At 504, system 100 can determine a difference between the foreground pixels in the image prior to overlay of the bounding boxes and the foreground pixels in the masked image (e.g., number of non-white pixels before masking—number of non-white pixels after masking). This defines a decrease in the number of foreground pixels in the masked image relative to the number of foreground pixels in the image prior to masking.

At 506, system 100 can report the coverage level provided by the OCR system 20 under evaluation for the image in question. The coverage level can be defined as the percent decrease in the number of non-white pixels after masking. Expressed as an equation, coverage=((number of non-white pixels before masking)—(number of non-white pixels after masking))/(number of non-white pixels before masking). OCR system 20 supplied OCR evaluation methods often use trained machine learning models and/or meta-methods where word and text level confidence scores are returned from providers themselves, each of which are biased towards showing good performance. As OCR coverage uses only the bounding box coordinates of detected lines/words in the OCR response, the results reported at 506 can ensure an independent and unbiased measure of OCR quality which enables an objective evaluation of OCR providers for any use-case. Additionally, the coverage calculation process and results are easy to understand and interpret for stakeholders across all domains.

Returning to FIG. 2, at 214, system 100 can modify OCR operations based on the determination at 212 (e.g., based on the coverage). This may include modifying an aspect of the OCR processing by OCR system 20 for subsequent image processing and/or modifying the workflow of device 10 for subsequent image processing. The modifying may include at least one of changing a customizable OCR parameter and replacing a first OCR system 20 with a second OCR system 20 (e.g., replacing Google OCR with Amazon Textract or vice versa).

System 100 can use various standards and/or considerations to determine what level of coverage is adequate for a given task. Acceptability for use cases in document understanding tasks may be a relative concept. Disclosed embodiments provide the ability to perform a comparative study on the quality of coverage of different third party or in-house OCR engines available to extract text from documents for downstream tasks. As such, acceptability can vary per use case and need not be tied to a specific value for the metric (or may be), but in general a higher value of the metric relates to higher acceptability of the OCR engine output. An ideal OCR extraction would be a metric value of 1. Accordingly, a downstream process or user may decide what level of extraction output is acceptable for a given task, such that if a threshold value is set by device 10, the modification can take place for results below that value, for example. Moreover, OCR engines may have several versions/tiers of their APIs with varying costs depending on OCR quality or amount of information returned in the response. Based on the metric value, system 100 can decide to move to a higher or lower tier based on quality-cost tradeoff needed. This can likewise be a factor for changing OCR providers. Since providers have different request and response structures and different data handling policies, there might be code changes in device 10 that may be required to integrate with the new formats as well as legal and compliance contract changes to deal with changed data policies.

Figure 6:
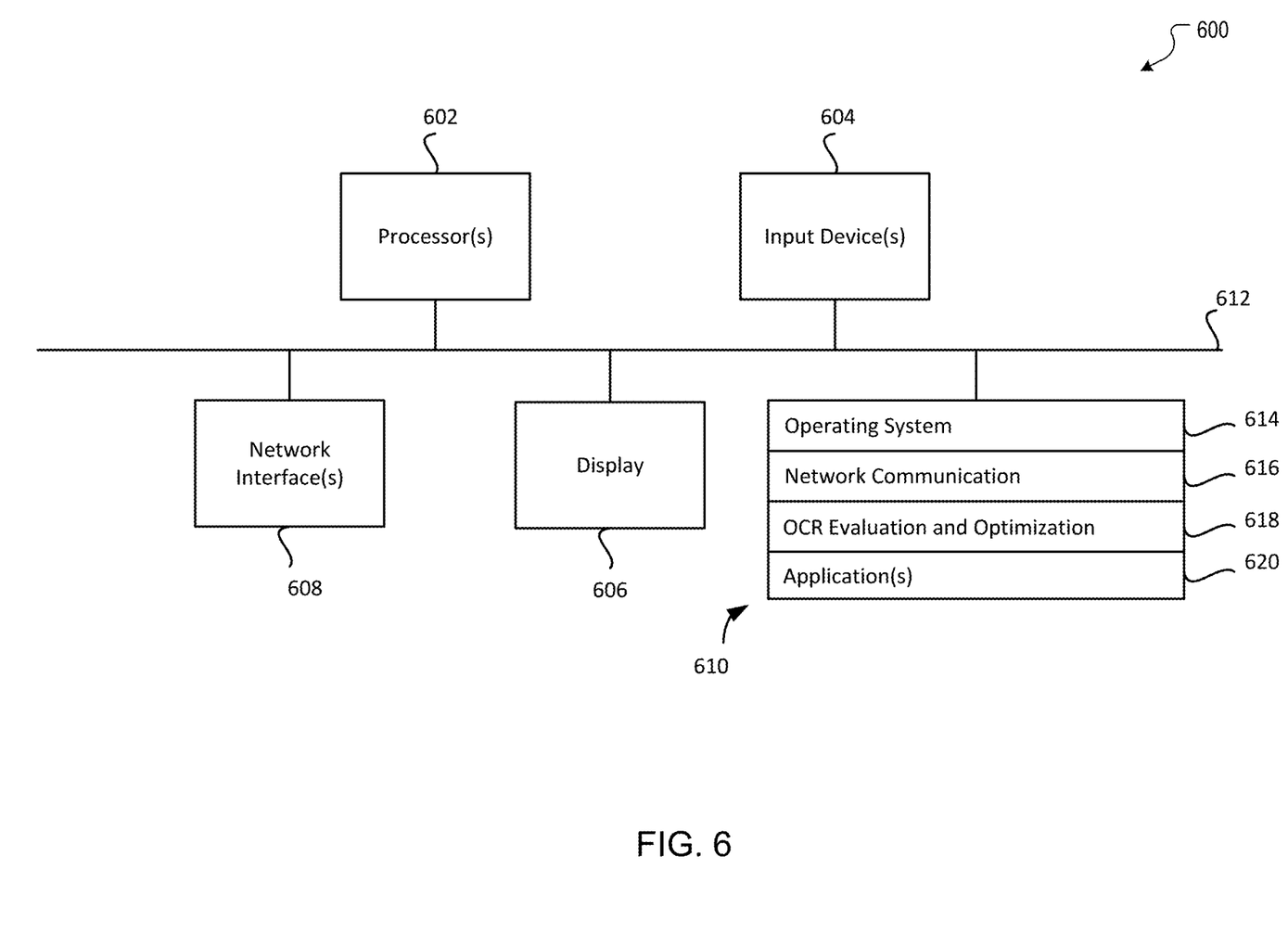
FIG. 6 shows a computing device according to some embodiments of the disclosure.

FIG. 6 shows a computing device 600 according to some embodiments of the disclosure. For example, computing device 600 may function as system 100 or any portion(s) thereof, or multiple computing devices 600 may function as system 100.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

OCR evaluation and optimization 618 may include the system elements and/or the instructions that enable computing device 600 to perform the processing of system 100 as described above, including preprocessing 110 and evaluation processing 120 components. Application(s) 620 may be an application that uses or implements the outcome of processes described herein and/or other processes. For example, application(s) 620 may include workflows of device 10 in embodiments where device 10 and system 100 are part of the same overall system. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above embodiments are applied to OCR evaluation and optimization, they may be readily adapted to evaluation and/or optimize any data processing that uses bounding boxes similar to OCR bounding boxes. Additionally or alternatively, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor, an image;
   determining, by the processor, a number of foreground pixels in the image;
   obtaining, by the processor, a result of optical character recognition (OCR) processing performed on the image;
   identifying, by the processor, at least one bounding box surrounding at least one portion of text in the result;
   overlaying, by the processor, the at least one bounding box on the image to form a masked image;
   determining, by the processor, a number of foreground pixels in the masked image;
   determining, by the processor, a decrease in the number of foreground pixels in the masked image relative to the number of foreground pixels in the image; and
   based on the decrease, modifying, by the processor, an aspect of the OCR processing for subsequent image processing.

2. The method of claim 1, further comprising preprocessing, by the processor, the image prior to determining the number of foreground pixels in the image, the preprocessing comprising at least one of converting the image to grayscale or binary intensity and normalizing pixel intensities.

3. The method of claim 1, wherein determining the number of foreground pixels in the image comprises calculating a threshold as an average pixel intensity and selecting all pixels having intensities above the threshold as foreground pixels.

4. The method of claim 3, further comprising setting, by the processor, an intensity of the at least one bounding box to a level below the threshold prior to overlaying the at least one bounding box on the image.

5. The method of claim 4, further comprising:
   selecting, by the processor, all pixels having intensities below the threshold as background pixels; and
   determining, by the processor, an average intensity of the background pixels;
   wherein setting the intensity of the at least one bounding box comprises setting the average intensity of the background pixels as the intensity of the at least one bounding box.

6. The method of claim 1, wherein identifying the at least one bounding box comprises parsing the result from a proprietary OCR format to a generic format.

7. The method of claim 1, wherein modifying the aspect of the OCR processing comprises at least one of changing a customizable OCR parameter and replacing a first OCR processing service with a second OCR processing service.

8. A system comprising:
   a processor; and
   a non-transitory memory in communication with the processor storing instructions that, when executed by the processor, cause the processor to perform processing comprising:
      receiving an image;
      determining a number of foreground pixels in the image;
      obtaining a result of optical character recognition (OCR) processing performed on the image;
      identifying at least one bounding box surrounding at least one portion of text in the result;
      overlaying the at least one bounding box on the image to form a masked image;
      determining a number of foreground pixels in the masked image;
      determining a decrease in the number of foreground pixels in the masked image relative to the number of foreground pixels in the image; and
      based on the decrease, modifying an aspect of the OCR processing for subsequent image processing.

9. The system of claim 8, wherein the processing further comprises preprocessing the image prior to determining the number of foreground pixels in the image, the preprocessing comprising at least one of converting the image to grayscale or binary intensity and normalizing pixel intensities.

10. The system of claim 8, wherein determining the number of foreground pixels in the image comprises calculating a threshold as an average pixel intensity and selecting all pixels having intensities above the threshold as foreground pixels.

11. The system of claim 10, wherein the processing further comprises setting an intensity of the at least one bounding box to a level below the threshold prior to overlaying the at least one bounding box on the image.

12. The system of claim 11, wherein the processing further comprises:
   selecting all pixels having intensities below the threshold as background pixels; and
   determining an average intensity of the background pixels;
   wherein setting the intensity of the at least one bounding box comprises setting the average intensity of the background pixels as the intensity of the at least one bounding box.

13. The system of claim 8, wherein identifying the at least one bounding box comprises parsing the result from a proprietary OCR format to a generic format.

14. The system of claim 8, wherein modifying the aspect of the OCR processing comprises at least one of changing a customizable OCR parameter and replacing a first OCR processing service with a second OCR processing service.

15. A method comprising:
   receiving, by a processor, an image being processed by a computerized workflow;
   determining, by the processor, a number of foreground pixels in the image;
   obtaining, by the processor, a result of optical character recognition (OCR) processing performed on the image in the computerized workflow;
   identifying, by the processor, at least one bounding box surrounding at least one portion of text in the result;
   overlaying, by the processor, the at least one bounding box on the image to form a masked image;
   determining, by the processor, a number of foreground pixels in the masked image;
   determining, by the processor, a decrease in the number of foreground pixels in the masked image relative to the number of foreground pixels in the image; and
   based on the decrease, modifying, by the processor, the workflow for subsequent image processing, the modifying comprising at least one of changing a customizable OCR parameter and replacing a first OCR processing service with a second OCR processing service.

16. The method of claim 15, further comprising preprocessing, by the processor, the image prior to determining the number of foreground pixels in the image, the preprocessing comprising at least one of converting the image to grayscale or binary intensity and normalizing pixel intensities.

17. The method of claim 15, wherein determining the number of foreground pixels in the image comprises calculating a threshold as an average pixel intensity and selecting all pixels having intensities above the threshold as foreground pixels.

18. The method of claim 17, further comprising setting, by the processor, an intensity of the at least one bounding box to a level below the threshold prior to overlaying the at least one bounding box on the image.

19. The method of claim 18, further comprising:
   selecting, by the processor, all pixels having intensities below the threshold as background pixels; and
   determining, by the processor, an average intensity of the background pixels;
   wherein setting the intensity of the at least one bounding box comprises setting the average intensity of the background pixels as the intensity of the at least one bounding box.

20. The method of claim 15, wherein identifying the at least one bounding box comprises parsing the result from a proprietary OCR format to a generic format.

\* \* \* \* \*